United States Patent [19]
Leslie et al.

[11] 3,917,715
[45] Nov. 4, 1975

[54] 4-HYDROXY-3,3',4'-TRICHLORODIPHENYL SULPHONE AND ALKALI METAL SALTS THEREOF

[75] Inventors: Victor Jeffrey Leslie, Potters Bar; John Brewster Rose, Letchworth, both of England

[73] Assignee: Imperial Chemical Industries Limited, London, England

[22] Filed: Apr. 26, 1974

[21] Appl. No.: 464,700

Related U.S. Application Data

[62] Division of Ser. No. 323,356, Jan. 15, 1973, Pat. No. 3,830,781.

[30] Foreign Application Priority Data
Jan. 25, 1972  United Kingdom.................. 3437/72

[52] U.S. Cl............................................ 260/607 A
[51] Int. Cl.²..................................... C07C 147/10
[58] Field of Search............................. 260/607 A

[56] References Cited
UNITED STATES PATENTS
3,471,576  10/1969  Klesper et al................... 260/607 A
3,830,781  8/1974  Leslie et al. ..................... 260/607 A

FOREIGN PATENTS OR APPLICATIONS
1,136,514  12/1968  United Kingdom............. 260/607 A

OTHER PUBLICATIONS
J. Org. Chem. U.S.S.R., 6, pp. 2311–14 (1970).
Polymer (1972), Vol. 13, pp. 465–74 (Eng.).

*Primary Examiner*—Lewis Gotts
*Assistant Examiner*—D. R. Phillips
*Attorney, Agent, or Firm*—Cushman, Darby & Cushman

[57] ABSTRACT

A halophenol of the formula

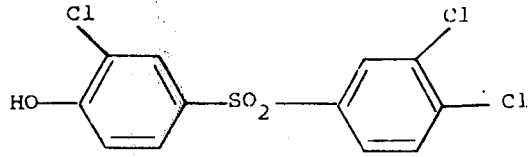

or alkali metal salt thereof. The compound is useful as a monomer in the preparation of aromatic sulphone polymers possessing improved fire resistance.

1 Claim, No Drawings

4-HYDROXY-3,3',4'-TRICHLORODIPHENYL SULPHONE AND ALKALI METAL SALTS THEREOF

This is a division of application Ser. No. 323,356, filed Jan. 15, 1973, now U.S. Pat. No. 3,830,781.

This invention relates to new aromatic polymers and to new chemical intermediates from which they may be produced.

In the specifications of British Pat. Nos. 1,153,035, 1,153,528 and 1,234,301 and Belgian Pat. No. 729,715 the disclosures of which are incorporated herein by reference, there are described methods for the production of aromatic polymers in which a dihalobenzenoid compound having each halogen atom activated by an electron-attracting group is caused to react with a substantially equivalent amount of an alkali metal hydroxide. The dihalobenzenoid compound may, in particular, have the formula

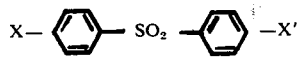

or 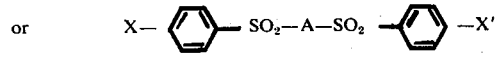

where X and X' are halogen atoms (preferably chlorine or fluorine) and A is a bivalent aromatic radical of, for example, benzene, naphthalene or biphenyl. Also described therein and in British Specification No. 1,177,183 (the disclosure of which is incorporated herein by reference) is the production of aromatic polymers whose molecular chains comprise units of the formula

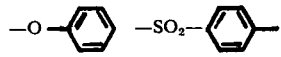

in which an alkali metal salt of a halophenol of the formula

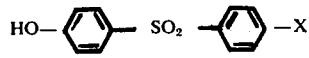

(where X is halogen) is polymerised by the displacement of alkali metal halide.

In British Specification Nos. 1,078,234 and 1,133,561 (the disclosure of which are also incorporated herein by reference), there is described a method for the production of aromatic polymers in which a dihalobenzenoid compound having each halogen atom activated by an electron-attracting group is caused to react with a di-(alkali metal) salt of a dihydric phenol in the liquid phase of an inert highly polar organic solvent. In particular, the dihalobenzenoid compound may have the formula

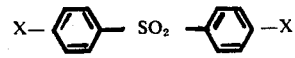

(where X is halogen, preferably chlorine or fluorine) and the dihydric phenol may be one of the following:

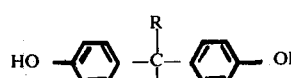

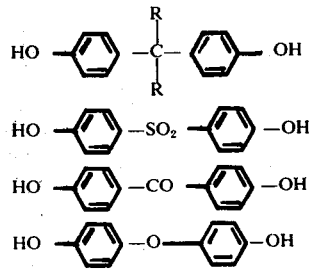

(where the R group represents hydrogen, lower alkyl, lower aryl and the halogen-substituted groups thereof).

According to the present invention there are provided new aromatic polymers whose molecular chains comprise units of the formula

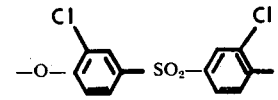

either alone or copolymerised with other units, and in particular with units of the formula

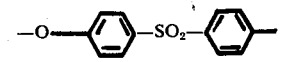

Polymers containing units of the former formula are of higher fire resistance than equivalent polymers having units of the latter formula alone.

According to the invention there are also provided as a new chemical intermediates 4-hydroxy-3,3',4'-trichlorodiphenyl sulphone and the alkali metal salts thereof.

Of these compounds, 4-hydroxy-3,3',4'-trichlorodiphenyl sulphone possessing a reactive chlorine atom as well as a phenolic group, can serve as a valuable chemical intermediate for producing a variety of products; for example the chlorine atom can be replaced by amino and substituted amino groups or by oxygen- or sulphur-containing anions to produce amines, ethers and sulphides.

The alkali metal salts of this chlorophenol can be polymerised to give the new polymers of the invention.

This chlorophenol and its alkali metal salts may be prepared by for example the route outlined below in which the halophenol is made from the tetrachlorophenyl sulphone in a manner similar to that described for the halfway hydrolysis of bis-(4-chlorophenyl) sulphone in British Specification No. 1,153,035.

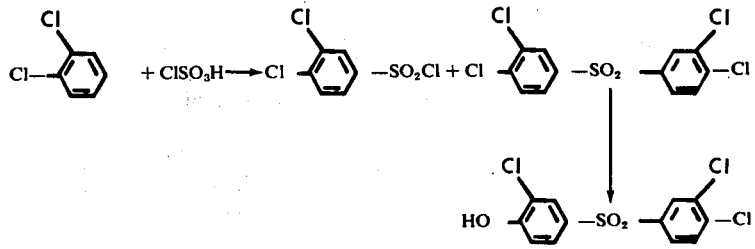

The alkali metal salt of the chlorophenol is initially obtained dissolved in the reaction medium and is preferably used directly, although for the purpose of purification it may be more convenient in some cases to acidify and then isolate the free chlorophenol. This can be converted back into an alkali metal salt by treatment with a suitable base (e.g. an alkali metal hydroxide or alkoxide).

The alkali metal is conveniently potassium or sodium. Displacement of alkali metal halide often occurs more readily if the potassium cation is present in the reagent used, but the weight (and usually the price) per mole of a potassium compound is higher than for the corresponding sodium compound. Some or all of the alkali metal cation in the reagent may be replaced by an organic onium cation having a positively charged heteroatom (for example a quaternary ammonium cation such as tetramethyl ammonium) stable under the conditions of the reaction, and the term "alkali metal salt" as used herein is deemed to refer also to salts containing such onium cations.

Further according to the invention, there is provided a method for making new aromatic polymers having units of the formula

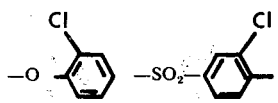

in which an alkali metal salt of 4-hydroxy-3,3',4'-trichlorodiphenyl sulphone or a mixture of 3,3',4,4'-tetrachlorodiphenyl sulphone and an equivalent amount of an alkali metal hydroxide or of the di-(alkali metal) salt of a dihydric phenol is polymerised at 150°–400°C by the displacement of alkali metal halide. These reagents may be polymerised alone, or they may be copolymerised with alkali metal salts of at least one other activated halophenol (or with a mixture of at least one activated dihalobenzenoid compound and an equivalent amount of alkali metal hydroxide), in particular those described in British Specification Nos. 1,153,035 and 1,177,183; or they may be copolymerised with a mixture of di-(alkali metal) salt of at least one dihydric phenol and at least one activated dihalobenzenoid compound as described in British Specification Nos. 1,078,234 and 1,133,561. The halogen atoms in the halophenol or dihalobenzenoid compound are activated by electron-attracting groups such as —$SO_2$— ortho or para to the halogen atom. The comonomer may for example be an alkali metal salt of a 4-(4-halophenylsulphonyl) phenol or a mixture of a bis(4-halophenyl) sulphone with an equivalent amount of alkali metal hydroxide. The halogen atoms in the comonomer are preferably chlorine (for cheapness) or fluorine (for greater reactivity), although the bromine derivatives may also be used.

The polymerisation is preferably carried out in a polar liquid which is a solvent for alkali metal phenoxides and is stable under the reaction conditions employed, although an alkali metal salt of 4-hydroxy3,3',-4'-trichlorophenyl sulphone may also be polymerised or copolymerised with another alkali metal salt of a halophenol in the melt.

Suitable polar liquids for the reaction include the lower dialkyl and cyclic alkylene sulphoxides and sulphones (e.g. dimethyl sulphoxide and 1,1-dioxothiolan, aromatic nitriles (e.g. benzonitrile) and diaryl ketones (e.g. benzophenone), sulphoxides and sulphones. The total amount of solvent used is desirably sufficient to ensure that none of the starting materials are in the solid state in the reaction mixture.

Changing the liquid reaction medium may be convenient as it allows the initial use of liquids that would be less suitable for the final stages, being for example inconveniently volatile or unstable at polymerisation temperatures or incapable of dissolving the resultant polymer to the desired extent. For example, dimethyl sulphoxide is a convenient solvent, especially for the hydrolysis of 3,3',4,4'-tetrachloro-diphenyl sulphone with alkali metal hydroxide, but it cannot be used at such high temperatures as 1,1-dioxothiolan (cyclic tetramethylene sulphone).

The liquid reaction medium need not contain any solvents for polymer of high molecular weight even at the later stages of the reaction, although if it does not the product is of relatively low molecular weight unless the final stage of polymerisation is carried out in the melt; this may be explained if the molecular chains of the polymer cease to grow in the solid state.

The rate of polymer formation in the reaction of the invention rises with rise of temperature and below 200°C is usually uneconomically slow. It may, however, be advantageous to preheat the reaction mixture between 150°C and 200°C and then raise the temperature to produce the polymer. Temperatures up to 400°C may be employed, and about 250°C is usually convenient.

The reaction should initially be carried out under pressure if necessary to prevent the escape of any dihalobenzenoid compound and any volatile solvent or cosolvent. Heating in vacuum may however be desirable at a later stage to remove unwanted solvents, e.g. dimethyl sulphoxide which may decompose at the temperatures required to produce high polymer.

The vessel used should be made of or lined with a material that is inert to alkali metal phenoxides and also to alkali metal halides under the conditions employed. For example, glass is unsuitable as it tends to react with phenoxide anions at high temperatures, upsetting the stoichiometry of the polymerisation and contaminating the product with silicate. Some grades of stainless steel undergo surface crazing at these temperatures in the presence of alkali metal halide, and vessels made of or lined with titanium or nickel or an alloy thereof or some similarly inert material are preferable.

The polymerisation may conveniently be carried out in an extruder or on a heated metal band.

To neutralise any reactive oxygen- or sulphur-containing anions, a reagent therefor may be introduced at the termination of the polymerisation. Reactive monofunctional halides, for example methyl chloride, are particularly suitable.

The alkali metal halide can be removed from the resultant high polymer by any suitable means. For example, it can be extracted from the high polymer using water, or the polymer itself can be dissolved in a strongly polar organic solvent (for example dimethyl formamide, 1-methyl-2-oxopyrrolidine, dimethyl sulphoxide, 1,1-dioxothiolan or nitrobenzene) and then reprecipitated by addition to a liquid such as water which is miscible with the polymer solvent but itself is a nonsolvent for the polymer.

When the polymer is formed in solution, a convenient procedure is to add the reaction mixture (which may be decanted or filtered from solid alkali metal halide) to an excess of a liquid which is miscible with the reaction solvent but in which the polymer is insoluble. If the reaction solvent is water-miscible, or is miscible with a liquid in which residual alkali metal halide also dissolves, the polymer can thus be obtained in one step. Otherwise, as for example if the reaction mixture is poured into methanol, the precipitated polymer initially contains alkali metal halide which can subsequently be washed out with water.

The reduced viscosity of the polymers of the invention is desirably at least 0.3 (measured at 25°C at 1% w/v in a solvent such as dimethyl formamide) if they are to serve for structural purposes as a thermoplastic. In general, the new thermoplastic polymers of this invention may be used in any of the ways described for similar thermoplastic aromatic polysulphones in British Specification No. 1,016,245.

The following examples illustrate the invention.

EXAMPLE 1

Chlorosulphonic acid (1000 cm³; 14 moles) was added dropwise to 1,2-dichlorobenzene (730 g; 5 moles) over a period of 3 hours. The temperature was maintained at less than 25°C and the reaction mixture was stirred. After addition, the mixture was allowed to stand for 3 hours and then poured into water (10dm³). Chloroform (2 dm³) was added, insoluble solid filted off, and the chloroform layer separated, washed with water (2 × 1 dm³) and dried over magnesium sulphate. Evaporation of the chloroform yielded a dark oil which on distillation gave a colourless oil (boiling point 115°–120°C/8 torr; 246 g) having infra red spectrum consistent with its being 3,4-dichlorobenzene sulphonyl chloride.

The insoluble solid was washed with water, dried under vacuum, recrystallised from acetic acid to yield colourless plates (melting point 179.5°- 180°C; 210 g) which had infra red and nuclear magnetic resonance spectra (nmr) consistent with its being 3,3',4,4'-tetrachlorodiphenyl sulphone.

A sample of 3,3',4,4'-tetrachlorodiphenyl sulphone (400 g; 1.12 moles) was suspended in dimethyl sulphoxide (2 dm³) and the mixture was stirred under an atmosphere of nitrogen. To this mixture was added dropwise a solution of potassium hydroxide (2.24 mole) in water (300 cm³) and the resulting mix was heated at 100°C for 2 hours. After initial darkening, the mix became pale yellow. The mix was then poured into aqueous hydrochloric acid (400 cm³ concentrated acid in 2 dm³ water) and a colourless oil, which solidified on cooling was formed. The solid was filtered off, washed with cold water, dried in vacuo at 100°C, recrystallised from water to give colourless plates (melting point 196.5°–197.5°C; 368 g; 98% yield). The infra red and nmr spectra of the solid were consistent with its being 4-hydroxy-3,3',4'-trichlorodiphenyl sulphone. Thin layer chromatography using benzene/methanol (3:1 v/v) eluent on silica gel showed the presence of a single phenolic component in the reaction mix.

4-hydroxy-3,3',4'-trichlorophenyl sulphone (192.7 g; 0.572 mole) was suspended in methanol (1.4 dm³) under nitrogen at 60°C and aqueous potassium hydroxide (0.572 mole) was added. A yellow solution was formed which was concentrated under reduced pressure and evaporated to dryness to give a yellow powder. The yellow powder was dried under a high vacuum (<0.01 torr) at 120°C for 2 hours to yield the potassium salt of the trichlorophenol (216 g) which was stored over phosphorus pentoxide.

A sample (5 g) of the above potassium salt was placed in a tube which was evacuated (<1 torr) for 30 minutes. The tube was then heated at 310°C for 30 minutes, cooled to room temperature, opened and the contents dissolved in dimethyl formamide (20 cm³). The solution was filtered and poured into methanol to precipitate a white solid which was washed with methanol and dried in vacuum (<0.01 torr). The polymer had a reduced viscosity of 0.42 (as measured at 25°C on a solution in dimethyl formamide containing 1 g of polymer in 100 cm³ of solution) and had an nmr spectrum consistent with its having repeat units of the formula

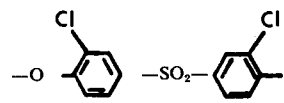

A film was compression-moulded at 300°C and was found to have superior fire-resistance to a similar film made from a polymer prepared by the method described in Example 3 of British Specification No. 1,153,035 but having a reduced viscosity of 0.4.

EXAMPLE 2

A sample (30 g) of the potassium salt described in Example 1 and diphenyl sulphone (20 g) were heated at 230°C for 17 hours under nitrogen. The solution was cooled to 160°C, dimethyl sulphate (0.3 cm³) added and the solution maintained at 160°C for 1 hour. Dimethyl formamide (100 cm³) was added, the solution filtered and then poured into a macerator containing methanol (500 cm³). The colourless solid so formed was filtered off, diphenyl sulphone was extracted with hot methanol (3 × 500 cm³) and with acetone/methanol (500 cm³; 1:1 v/v), and the solid then dried at 140°C. The solid was found to have a reduced viscosity of 0.3 (1% w/v in dimethyl formamide at 25°C) and an nmr spectrum consistent with its having repeat units of the formula

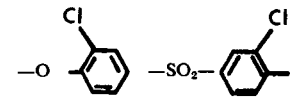

A film compression-moulded at 300°C from the polymer had a fire-resistance similar to that of the film moulded from the polymer made by the procedure given in Example 1.

The polymer was found to be amorphous by X-ray crystallography and had a Tg of 210°C as determined by Differential Scanning Calorimetry.

We claim:
1. A halophenol of the formula

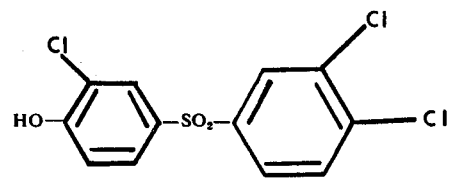

or alkali metal salt thereof.

* * * * *